(12) United States Patent
Cernohous et al.

(10) Patent No.: US 11,637,414 B2
(45) Date of Patent: Apr. 25, 2023

(54) THREE PHASE SWITCHGEAR USING SINGLE PHASE EQUIPMENT IN SINGLE CASING

(71) Applicant: ABB Schweiz AG, Baden (CH)

(72) Inventors: Josef Cernohous, Jamne nad Orlici (CZ); Tomas Kozel, Brno (CZ); Radek Javora, Hrusovany u Brna (CZ)

(73) Assignee: ABB Schweiz AG, Baden (CH)

( * ) Notice: Subject to any disclaimer, the term of this patent is extended or adjusted under 35 U.S.C. 154(b) by 80 days.

(21) Appl. No.: 17/338,685

(22) Filed: Jun. 4, 2021

(65) Prior Publication Data

US 2021/0313781 A1      Oct. 7, 2021

Related U.S. Application Data

(63) Continuation of application No. PCT/EP2019/084676, filed on Dec. 11, 2019.

(30) Foreign Application Priority Data

Dec. 19, 2018   (EP) ..................................... 18214153

(51) Int. Cl.
  *H02B 13/025*      (2006.01)
  *H02B 1/32*        (2006.01)
(52) U.S. Cl.
  CPC ............. *H02B 1/32* (2013.01); *H02B 13/025* (2013.01)
(58) Field of Classification Search
  CPC ........................... H02B 13/02–025; H02B 1/32
  See application file for complete search history.

(56) References Cited

U.S. PATENT DOCUMENTS

| 4,528,614 | A | | 7/1985 | Bharteey et al. |
| 5,585,611 | A | * | 12/1996 | Harvey ................ H01H 33/027 |
| | | | | 218/139 |

(Continued)

FOREIGN PATENT DOCUMENTS

| CN | 203119378 U | 8/2013 |
| CN | 105655912 A | 6/2016 |

(Continued)

OTHER PUBLICATIONS

Lammers et al., "MV vacuum switchgear based on magnetic actuators," *Trends in Distribution Switchgear, Conference Publication No. 459*, IEE, 86-90 (Nov. 10-12, 1998).

(Continued)

*Primary Examiner* — Robert J Hoffberg
(74) *Attorney, Agent, or Firm* — Leydig, Voit & Mayer, Ltd.

(57) ABSTRACT

A three phase switchgear or control gear includes: at least one compartment; a plurality of components for a first phase; a plurality of components for a second phase; and a plurality of components for a third phase. The plurality of components for the first phase, the plurality of components for the second phase, and the plurality of components for the third phase each include a main busbar, a three position linear or rotational movement disconnector switch, a single phase circuit breaker pole, and a cable connection. The plurality of components for the first phase, the plurality of components for the second phase, and the plurality of components for the third phase are housed in the at least one compartment.

4 Claims, 2 Drawing Sheets

(56) References Cited

U.S. PATENT DOCUMENTS

| | | | | |
|---|---|---|---|---|
| 6,518,531 | B2* | 2/2003 | Arioka | H02B 13/035 |
| | | | | 218/120 |
| 7,193,172 | B2* | 3/2007 | Rokunohe | H01H 33/22 |
| | | | | 218/43 |
| 7,417,846 | B2* | 8/2008 | Arioka | H02B 13/035 |
| | | | | 361/612 |
| 8,462,486 | B2* | 6/2013 | Fink | H02B 13/035 |
| | | | | 361/612 |
| 8,717,742 | B2* | 5/2014 | Kim | H02B 13/035 |
| | | | | 361/620 |
| 8,743,532 | B2* | 6/2014 | Yano | H02B 13/025 |
| | | | | 174/50.5 |
| 9,270,094 | B2* | 2/2016 | Yoshida | H02B 13/0358 |
| 9,588,151 | B2* | 3/2017 | Javora | G01R 19/0084 |
| 9,953,790 | B1* | 4/2018 | Miller | H01H 71/0207 |
| 10,305,262 | B2* | 5/2019 | Johnson | H02B 1/306 |
| 10,587,098 | B2* | 3/2020 | Johnson | H02B 1/306 |
| 10,673,212 | B2* | 6/2020 | Inoue | H02B 1/22 |
| 10,923,888 | B2* | 2/2021 | Benson | H02B 1/20 |
| 11,005,240 | B2* | 5/2021 | Kozel | H02B 13/0352 |
| 11,121,529 | B2* | 9/2021 | Kozel | H01H 33/027 |
| 11,139,642 | B2* | 10/2021 | Kozel | H02B 11/20 |
| 2007/0252599 | A1* | 11/2007 | Zhou | H01H 9/563 |
| | | | | 324/424 |
| 2015/0311684 | A1 | 10/2015 | Kagawa et al. | |
| 2020/0127448 | A1 | 4/2020 | Kozel et al. | |
| 2020/0130186 | A1 | 4/2020 | Kozel et al. | |
| 2020/0136358 | A1 | 4/2020 | Kozel et al. | |
| 2021/0183603 | A1* | 6/2021 | Javora | H01H 71/1009 |
| 2021/0305788 | A1* | 9/2021 | Kozel | H02B 1/26 |
| 2021/0305789 | A1* | 9/2021 | Kozel | H02B 13/02 |
| 2021/0313781 | A1* | 10/2021 | Cernohous | H02B 13/0352 |

FOREIGN PATENT DOCUMENTS

| | | | | |
|---|---|---|---|---|
| CN | 208045958 | U | 11/2018 | |
| EP | 0678956 | A1 | 10/1995 | |
| EP | 1983625 | A1* | 10/2008 | H02B 13/02 |
| EP | 2947733 | A1 | 11/2015 | |
| EP | 2953219 | A1* | 12/2015 | H02B 13/0358 |
| EP | 3386045 | A1* | 10/2018 | H02B 13/025 |
| RU | 2496199 | C2 | 10/2013 | |
| WO | WO-9621936 | A1* | 7/1996 | G01R 31/3274 |
| WO | WO-9737410 | A1* | 10/1997 | H02B 1/38 |
| WO | WOX 2018222837 | A1 | 12/2018 | |
| WO | WO-2019224974 | A1* | 11/2019 | H02B 13/035 |

OTHER PUBLICATIONS

Siemens AG, "Circuit-Breaker Switchgear Type NXAIR and NXAIR P, up to 24 kV, Air-Insulated," Catalog HA 25.71, 28 pp., downloaded from the Internet on Apr. 26, 2019, at https://w3.siemens.nl/powerdistribution/nl/SiteCollectionDocuments/en/mv/switchgear/air-insulated/nxair/catalogue-nxair-family_en.pdf (2012).

European Patent Office, Search Report in European Patent Application No. 178214153.1, 11 pp. (dated Feb. 23, 2022).

* cited by examiner

THREE PHASE SWITCHGEAR USING SINGLE PHASE EQUIPMENT IN SINGLE CASING

CROSS-REFERENCE TO PRIOR APPLICATIONS

This application is a continuation of International Patent Application No. PCT/EP2019/084676, filed on Dec. 11, 2019, which claims priority to European Patent Application No. 18 214 153.1, filed on Dec. 19, 2018. The entire disclosure of both applications is hereby incorporated by reference herein.

FIELD

The present invention relates to a three phase switchgear or control gear for low voltage, medium voltage or high voltage use with a substation.

BACKGROUND

In state-of-art switchgear and control gear (also called controlgear) designs the primary circuits of the three phases are arranged in groups for each feeder circuit, together forming a three phase feeder circuit. There is one common drive mechanism for the circuit breaker, one common drive for the disconnector and one common drive for the earthing switch for all three phases.

This arrangement can be problematic for handling and maintenance purposes, and has associated risks of internal arc faults in the complete power circuit.

There is a need to address these issues.

SUMMARY

In an embodiment, the present invention provides a three phase switchgear or control gear, comprising: at least one compartment; a plurality of components for a first phase; a plurality of components for a second phase; and a plurality of components for a third phase, wherein the plurality of components for the first phase, the plurality of components for the second phase, and the plurality of components for the third phase each comprise a main busbar, a three position linear or rotational movement disconnector switch, a single phase circuit breaker pole, and a cable connection, and wherein the plurality of components for the first phase, the plurality of components for the second phase, and the plurality of components for the third phase are housed in the at least one compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a better design of a switchgear or control gear.

In a first aspect, there is provided a three phase switchgear or control gear, comprising:
at least one compartment;
a plurality of components for a first phase;
a plurality of components for a second phase; and
a plurality of components for a third phase.

The plurality of components for the first phase, the second phase and the third phase each comprise a main busbar, a three position linear or rotational movement disconnector switch, a single phase circuit breaker pole, and a cable connection. The plurality of components for the first phase, the second phase and the third phase are housed in the at least one compartment.

In an example, the at least one compartment comprises at least two compartments. For the first phase, the second phase and the third phase the main busbar, the three position linear or rotational movement disconnector switch, and the single phase circuit breaker pole are housed in a first compartment of the at least two compartments.

In an example, the three cable connections are housed in a second compartment of the at least two compartments.

In an example, the second compartment comprises a door or removable wall section. The switchgear or control gear is configured such that an operator can gain access to the inside of the second compartment via the door or removable wall section whilst the switchgear or control gear is in operation.

In an example, the second compartment is separated from the first compartment by an arc proof segregation.

In an example, for the first phase, the second phase and the third phase, sets of bushings are used to connect the cable connections for each phase to components for each phase housed in the first compartment.

In an example, current and voltage sensors are embedded into each of the three sets of bushings.

In an example, the plurality of components for the first phase, the second phase and the third phase each comprises a circuit breaker single phase actuator.

In an example, the three circuit breaker single phase actuators are housed in a compartment other than the first compartment.

In an example, the at least one compartment comprises a third compartment. The three circuit breaker single phase actuators are housed in the third compartment.

In an example, the compartment within which the three circuit breaker single phase actuators are housed comprises a door or removable wall section. The switchgear or control gear is configured such that an operator can gain access to the inside of the third compartment via the door or removable wall section whilst the switchgear or control gear is in operation.

In an example, the compartment within which the three circuit breaker single phase actuators are housed is separated from the first compartment by an arc proof segregation.

In an example, current and voltage sensors are embedded in each of the three single phase circuit breaker poles.

Figure 1:
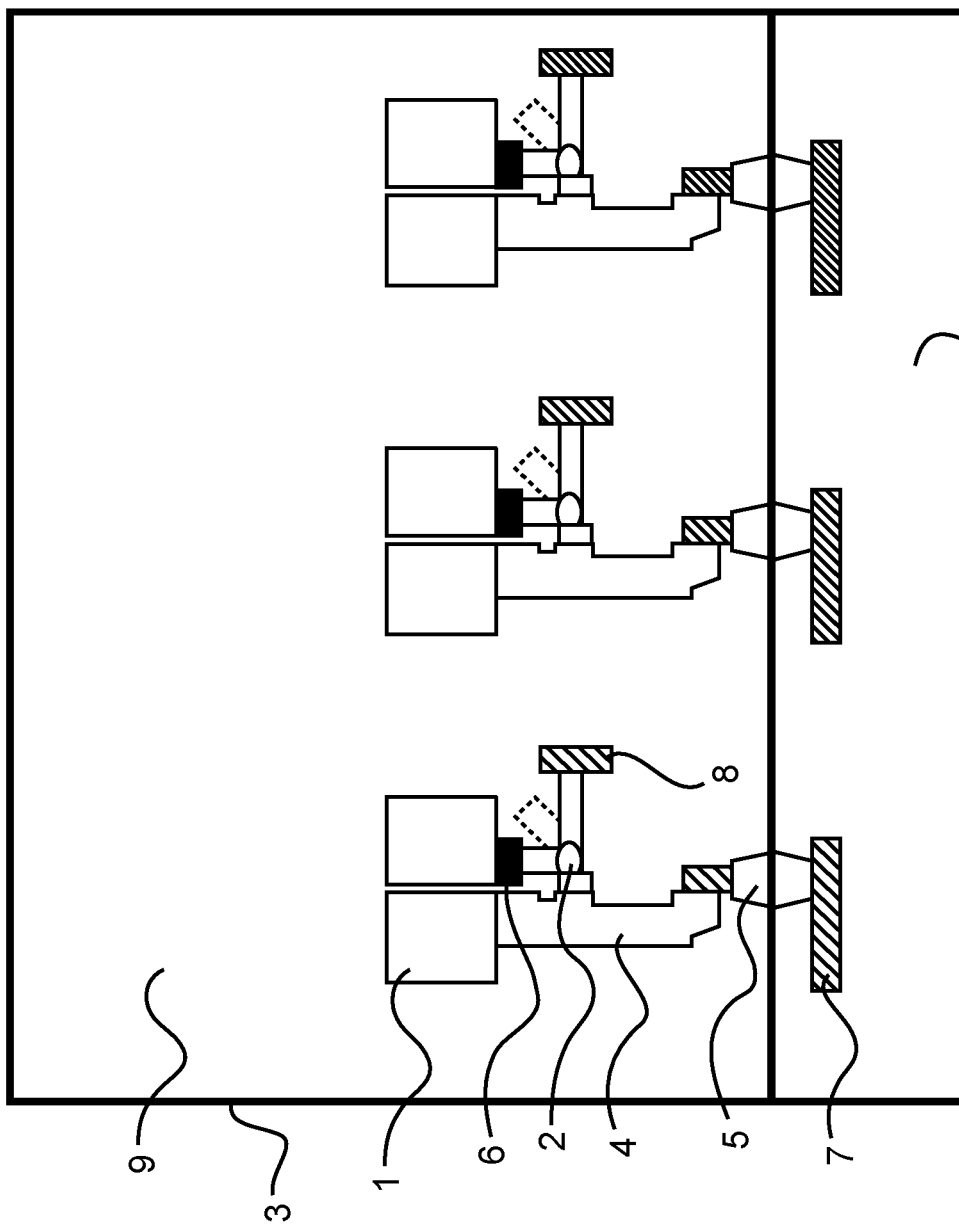
FIG. 1 shows an example of a three phase switchgear or control gear.
Figure 1:
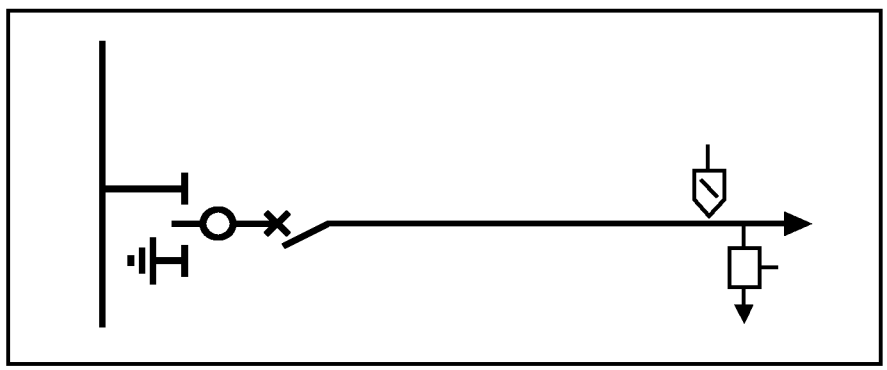
Figure 2:
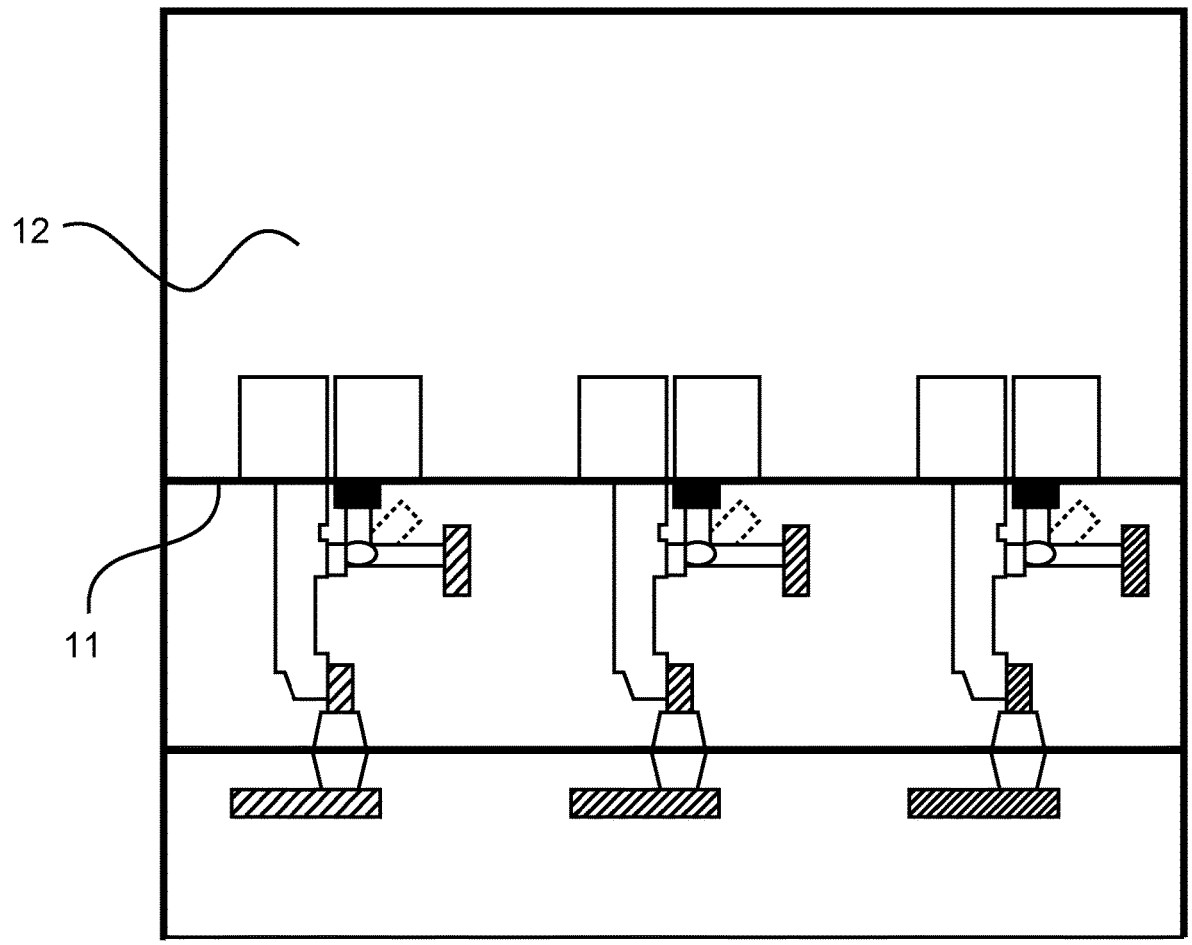
FIG. 2 shows an example of a three phase switchgear or control gear.

FIGS. 1-2 show examples of a switchgear or control gear for operation in a low voltage, medium voltage or high voltage substation.

One example relates to a three phase switchgear or control gear that comprises at least one compartment 3, 9, 10, 12, a plurality of components for a first phase, a plurality of components for a second phase, and a plurality of components for a third phase. The plurality of components for the first phase, the second phase and the third phase each comprise a main busbar 8, a three position linear or rotational movement disconnector switch 2, a single phase circuit breaker pole 4, and a cable connection 7. The plurality of components for the first phase the second phase and the third phase are housed in the at least one compartment.

According to an example, the at least one compartment comprises at least two compartments. For the first phase, the second phase and the third phase the main busbar, the three position linear or rotational movement disconnector switch, and the single phase circuit breaker pole are housed in a first compartment 9 of the at least two compartments.

According to an example, the three cable connections are housed in a second compartment 10 of the at least two compartments.

According to an example, the second compartment comprises a door or removable wall section. The switchgear or control gear is configured such that an operator can gain access to the inside of the second compartment via the door or removable wall section whilst the switchgear or control gear is in operation.

According to an example, the second compartment is separated from the first compartment by an arc proof segregation.

According to an example, for the first phase the second phase and the third phase, sets of bushings 5 are used to connect the cable connections for each phase to components for each phase housed in the first compartment.

According to an example, current and voltage sensors are embedded into each of the three sets of bushings.

According to an example, the plurality of components for the first phase the second phase and the third phase each comprises a circuit breaker single phase actuator 1.

According to an example, the three circuit breaker single phase actuators are housed in a compartment other than the first compartment.

According to an example, the at least one compartment comprises a third compartment 12. The three circuit breaker single phase actuators are housed in the third compartment.

According to an example, the compartment within which the three circuit breaker single phase actuators are housed comprises a door or removable wall section. The switchgear or control gear is configured such that an operator can gain access to the inside of the third compartment via the door or removable wall section whilst the switchgear or control gear is in operation.

According to an example, the compartment within which the three circuit breaker single phase actuators are housed is separated from the first compartment by an arc proof segregation 11.

According to an example, current and voltage sensors are embedded in each of the three single phase circuit breaker poles.

Thus, a new substation development is provided, where three phase switchgear or control gear have arrangements of the primary circuits that separate phase by phase. This enables the drives of all switching devices to be designed as single phase only and thus avoiding the need for a parallel arrangement. Having the drives per single phase (i.e. tripling the number of needed drives) the primary circuits of each phase can be arranged in much more compact way bringing substantial material and assembly work savings, while the phase-to-phase distance increases significantly. There is also improved behavior of the switchgear or control gear in many operational aspects.

The new design is applicable to both human operated switchgear and control gear as well as the switchgear or control gear with unmanned operation and maintenance.

To put this another way, all the current state-of-art switchgear and control gear design have primary circuits that are grouped per feeder. However, for the new design described here it has been found to be advantageous for the switchgear or control gear to move to phase by phase arrangement on the primary circuits. This arrangement reduces the number of components on primary circuits to a minimum, decreases the risk of internal arc faults in the complete power circuit and allows modularization of the components to single phase switching device plus drive subassemblies. This facilitates better handled by human or automation maintenance systems (lower weight and dimensions compared to today's three phase devices).

Continuing with the figures, specific features are now described.

FIG. 1 shows a detailed example of a three phase switchgear or control gear, where for ease of reference the following features shown are listed:

1. Circuit breaker phase actuator and auxiliaries;
2. Three position disconnector with single phase actuator and auxiliaries;
3. Arc proof enclosure;
4. Single phase circuit breaker pole;
5. Bushing with embedded current and voltage sensors;
6. Earth copper;
7. Cable connections copper;
8. Main busbars;
9. Main space for circuits (this can include an automation maintenance system);
10. Cable compartment segregated from the main space for circuits 9, with sidewalls for segregation between feeders, accessible after removing a removable cover or opening doors (shown as the bottom wall in FIG. 1).

As shown in FIG. 1 the primary circuits of the different phases of a three phase switchgear or control gear are in a phase by phase arrangement, rather than per feeder groups. The following advantages can be gained by separating the phases:

1.) Limiting the number of components and the total length of the primary circuits to a minimum;
2.) Decreasing the risk of phase-to-phase internal arc faults by increasing the distance between phases, while keeping a small footprint of the switchgear or control gear;
3.) Increased phase to phase distance results in lower mechanical stress on the primary circuits in case of a short circuit;
4.) Increased phase to phase distance results in lower dielectric stress on the insulation components;
5.) The switchgear or control gear footprint can be significantly reduced by this arrangement;
6.) The heat ventilation can be improved compared to today state-of-art, allowing better utilization of copper
7.) Ability to switch single phase loads.

The new switchgear or control gear arrangement of phase by phase opens space for redesign of the main switching devices, that can be modularized to a single phase switching device plus drive subassemblies. This can be better handled by human or automation maintenance systems (lower weight and dimensions compared to today three phase devices).

Many components used in existing switchgear or control gear arrangements can be reused in the new arrangement. A three position disconnector switch is shown in FIG. 1, however it withdrawal breaker operating principle is a viable alternative option.

The feeder circuit in each phase has a short T-off from the main busbar, a three position disconnector switch, a circuit breaker and cable connection bars. While the main busbars and switching devices can be located in one big compartment common for all feeders, the cable connections are located in a cable termination box that is separate for each feeder. This facilitates access to the cable terminations for human operators, while the switchgear or control gear is in operation.

The cable compartment segregation from the main circuit space provides a minimum IP1x degree of protection for the operator. Each segregated cable compartment is equipped with flaps for exhaust of the hot gases in case of internal arc or a quick acting active arc fault protection can be used for avoiding pressurizing of the cable compartments. Each cable compartment enclosures can then be arc proof towards the main circuit's main space as well as towards outer space.

The current and voltage measurement is provided preferably by current and voltage sensors, that can be embedded in bushings segregating the main circuit space from the cable compartment.

As shown in FIG. 1, current and voltage measurement is provided via current and voltage sensors embedded in bushings. However, the current and voltage measurement can be provided by current and voltage transformers.

The FIG. 1 is showing the main circuit's compartment common for all three phases. Providing earthed metallic or insulating material segregation between phases further increases the protection against internal arc between phases.

FIG. 1 show the cable compartment box 10 embedding all three phases for each feeder. The cable compartment can be further segregated per phase to increase protection against internal arc between phases.

FIG. 1 shows the cable compartment that is arc proof separated from the main circuit space. However, the cable compartment does not have to be separated from the main circuit space.

It is also to be noted that the rotational three position disconnector switches shown in FIG. 1 can be replaced with a linear three position disconnector switches.

However, the withdrawable operating principle can be applied, i.e. instead of having a disconnector switch device the circuit breaker pole can be designed as withdrawable and the movement of the pole does the disconnecting.

In FIG. 1, the current and voltage sensors are shown embedded in the bushings. However, these components can be designed as stand alone as well, and positioned in the cable compartment or in the main circuits compartment. Also, the current and voltage sensors can be embedded in a circuit breaker pole.

FIG. 1 shows a switchgear or control gear with unmanned operation, with primary circuits in the main circuits' space accessible for human operator only when de-energized.

As shown in FIG. 2 the same principles as described with respect to FIG. 1 are implemented, for a switchgear or control gear that is human operated and maintained. A safe space 12 is provided as an additional compartment within which the circuit breaker single phase actuators and auxiliaries are housed, with this safe space 12 segregated from the main compartment by an additional arc proof segregation 11. Thus, further functionality is provided by adding an arc proof segregation covering the main circuits' compartment for maintenance and operation personnel. The bottom wall of the cable termination compartment, shown at the bottom of FIG. 2, can be a removable cover or doors enabling access by human operator.

The primary circuit can include other components and devices not described in FIG. 1, such as earthing switch, voltage indication, surge arrestors, UFES, IS-limitors, contactors, load-break switches, fuses. The described principles of phase by phase separation is kept in that case.

It is also to be noted that the switchgear or control gear outer envelope does not have to be arc proof if the switchgear or control gear is located in a substation denying human access when the switchgear or controlgear is in operation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A three phase switchgear or control gear, comprising:
   a first compartment;
   a second compartment;
   a third compartment;
   a first plurality of components for a first phase;
   a second plurality of components for a second phase; and
   a third plurality of components for a third phase;
   wherein, each of the first, second, and third pluralities of components comprises a main busbar, a three position linear or rotational movement disconnector switch, a single phase circuit breaker pole, a circuit breaker single phase actuator and a cable connection;
   wherein for the first phase, the second phase, and the third phase, the main busbar, the three position linear or rotational movement disconnector switch, and the single phase circuit breaker pole are housed in the first compartment;
   wherein the cable connection for each of the first phase, the second phase, and the third phase is housed in the second compartment;
   wherein the second compartment comprises a first door or removable wall section, and wherein the switchgear or control gear is configured such that an operator can gain access to an inside of the second compartment via the first door or removable wall section whilst the switchgear or control gear is in operation; and
   wherein the circuit breaker single phase actuator for each of the first phase, the second phase, and the third phase is housed in the third compartment;
   wherein the third compartment comprises a second door or removable wall section, and wherein the switchgear or control gear is configured such that the operator can gain access to an inside of the third compartment via the second door or removable wall section whilst the switchgear or control gear is in operation;

wherein the second compartment is separated from the first compartment by a first arc proof segregation; and wherein the third compartment is separated from the first compartment by a second arc proof segregation.

2. The three phase switchgear or control gear according to claim 1, wherein for the first phase, the second phase and the third phase, sets of bushings are used to connect the cable connections for each phase to components for each phase housed in the first compartment.

3. The three phase switchgear or control gear according to claim 2, wherein current and voltage sensors are embedded into each of the three sets of bushings.

4. The three phase switchgear or control gear according to claim 1, wherein current and voltage sensors are embedded in each of the three single phase circuit breaker poles.

* * * * *